Aug. 22, 1961

W. A. MENZEL 2,996,991

ONE-LEAD CHARGING SYSTEM FOR A TIMING DEVICE

Filed July 7, 1954

INVENTOR
W. A. MENZEL

BY

ATTORNEYS

Aug. 22, 1961 W. A. MENZEL 2,996,991
ONE-LEAD CHARGING SYSTEM FOR A TIMING DEVICE
Filed July 7, 1954 3 Sheets-Sheet 2
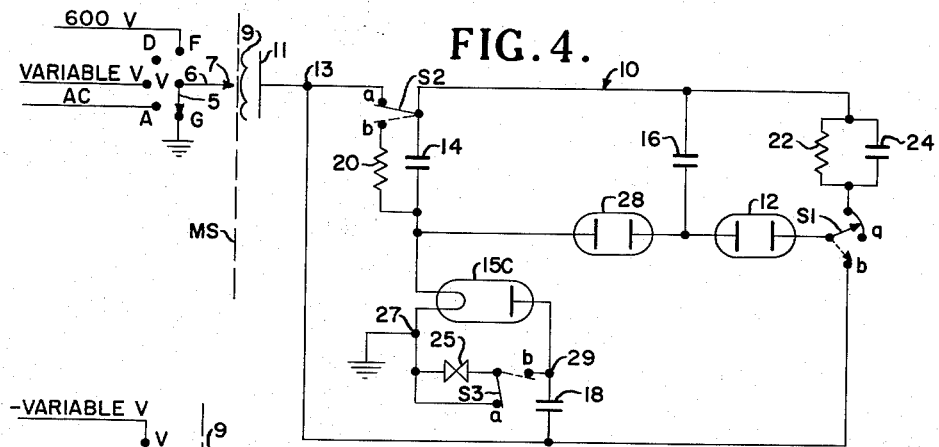
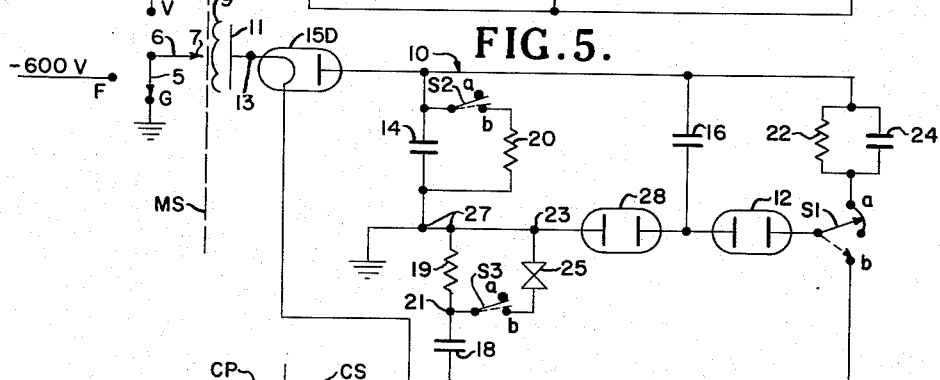
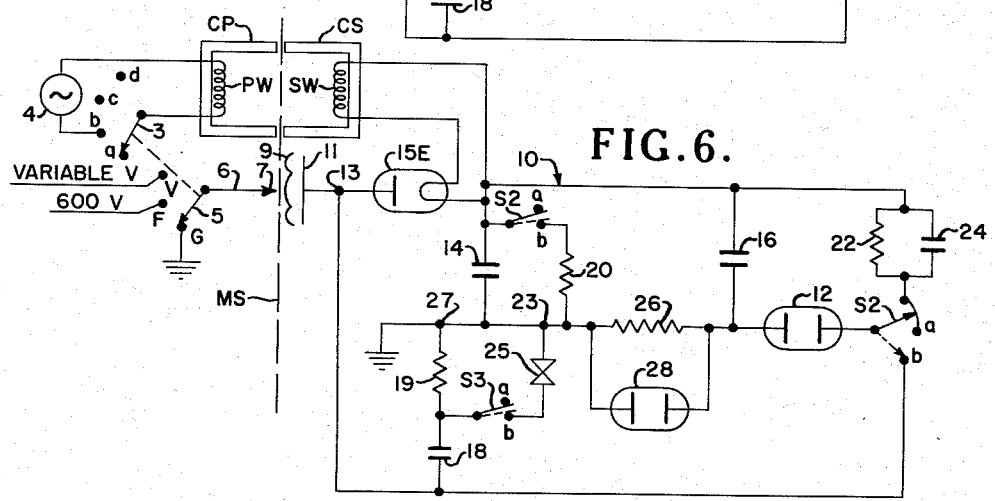
INVENTOR
W. A. MENZEL Aug. 22, 1961      W. A. MENZEL      2,996,991
ONE-LEAD CHARGING SYSTEM FOR A TIMING DEVICE
Filed July 7, 1954      3 Sheets-Sheet 3

INVENTOR
W. A. MENZEL

BY
ATTORNEYS

United States Patent Office 2,996,991
Patented Aug. 22, 1961

2,996,991
ONE-LEAD CHARGING SYSTEM FOR A TIMING DEVICE
Wolfgang A. Menzel, Silver Spring, Md., assignor to the United States of America as represented by the Secretary of the Navy
Filed July 7, 1954, Ser. No. 441,955
20 Claims. (Cl. 102—70.2)
(Granted under Title 35, U.S. Code (1952), sec. 266)

The invention described herein may be manufactured and used by or for the Government of the United States of America for governmental purposes without the payment of any royalties thereon or therefor.

This invention relates to electric timing devices for use in ordnance fuzes and more particularly pertains to a one-lead charging system for charging the timing devices.

In the copending application of Herbert E. Ruehlemann, Serial No. 219,302, filed April 4, 1951 now Patent No. 2,981,890, and the copending application of Herbert E. Ruehlemann et al., Serial No. 290,374, filed May 27, 1952 now Patent No. 2,910,001, time measuring devices are disclosed for measuring predetermined time intervals, which measured time intervals are independent of variations in breakdown potential of the discharge device associated with the circuit, and also independent of the stability of the charging potential. In copending application 219,302 there is disclosed a time measuring device employing three condensers and an electron discharge device. One of the condensers, hereinafter referred to as a timing condenser, is charged to a predetermined voltage and during the timing cycle is discharged through a resistance thereby providing a voltage which decays exponentially with respect to time. A second condenser referred to as the reference condenser is initially charged to a voltage proportional to, but less than the voltage applied to the timing condenser, the third condenser referred to as the stabilizing condenser being initially charged to a voltage greater than the breakdown potential of the discharging device and then stabilized at a voltage equal to the discharge device breakdown potential. During the timing cycle, the condensers are connected in series circuit with the discharge device, the condensers being arranged so that the potential on the reference condenser aids the potential on the stabilizing condenser, and opposes the potential on the timing condenser.

The timing condenser is connected to a resistance discharge path during the timing cycle and when the potential thereof decays to a value equal to the potential on the reference condenser, the discharge device is rendered conducting thereby actuating a utility device such as a fuze.

Thus, the time measurement is a period which is dependent only on the rate of decay of the voltage on the timing condenser through the resistance discharge path and the proportionality factor between the potential applied to the timing condenser and the potential applied to the reference condenser, and independent of variations of breakdown potential of the discharge device and also independent of variations of the supply voltage utilized to charge the condensers.

It has heretofore been proposed to charge the reference condenser in series with the stabilizing condenser and to proportion the values of the stabilizing and reference condensers so that the proportionality factor is a predetermined value. However, this necessitated a critical matching of the capacity values of the reference and stabilizing condensers. Thereafter, there was proposed, in the copending application Serial No. 290,374, to charge each of the condensers separately. This necessitated three separate leads to the timing circuit, one of which applied a variable voltage to the timing condenser to thereby permit variations in the timing measurement; a second lead to apply a voltage to the stabilizing condenser which was greater than the breakdown potential of the discharge device; and a third lead to apply a voltage to the reference condenser proportional to the voltage applied to the timing condenser. In certain applications of the timing device, such as in ordnance fuzes, wherein three separate charging voltages must be supplied from a remote power supply, the use of three separate charging leads is undesirable.

In the copending application of Herbert E. Ruehlemann, Serial No. 365,790, filed July 2, 1953, there was proposed a two lead charging system for a voltage stabilized timing circuit in which the measured time interval is varied by varying the potential applied to the reference condenser. This was accomplished by applying a constant charging voltage through a single lead to both the timing condenser and the stabilizing condenser, and by applying a variable charging voltage through another lead to the reference condenser. Although a two lead charging system does have advantages over a three lead charging system, it is most desirable to reduce the number of charging leads to a minimum.

A primary object of this invention is to reduce the number of leads necessary for the independent charging of the condensers in a voltage stabilized timing circuit to a single lead.

Another object of this invention is to charge a timing circuit through a single lead with two voltages of different potentials.

A further object of this invention is to provide a timing circuit energized through a single lead with two voltages of different potentials, an electrically conductive circuit presenting a conductive path to both of said two voltages, and a discriminator circuit presenting a conductive path to one of the voltages and a non-conductive path to the other of the voltages.

A still further object of this invention is to provide, in a timing circuit energized through a single lead with two voltages of different potentials, discriminating means for presenting a conductive circuit to one of the voltages and an open circuit to the other of the voltages.

A still another object is to provide, in a timing circuit energized through a single lead with two voltages of different potentials, a fuze for passing one of the voltages and for presenting an open circuit to the other of the voltages.

Another further object of this invention is to provide, in a timing circuit energized through a single lead with two voltages of different potentials, an electro-thermically operative switch which is preheated to present a closed path to one of the voltages and which rapidly pulls open to present an open circuit to the other of the voltages.

A still further object is to provide, in a timing circuit energized through a single lead with two voltages of different potentials, a diode which is rendered conductive to pass one of the voltages and non-conductive to present an open circuit to the other of the voltages.

Another further object is to apply two voltages individually in a predetermined sequence to a single lead for charging a timing circuit through the single lead.

Other objects and many of the attendant advantages of this invention will be readily appreciated as the same becomes better understood by reference to the following detailed description when considered in connection with the accompanying drawings wherein:

FIGS. 3 to 9 inclusive illustrate various modifications utilizing a diode to interconnect the single lead to the timing circuit.

Figure 1:
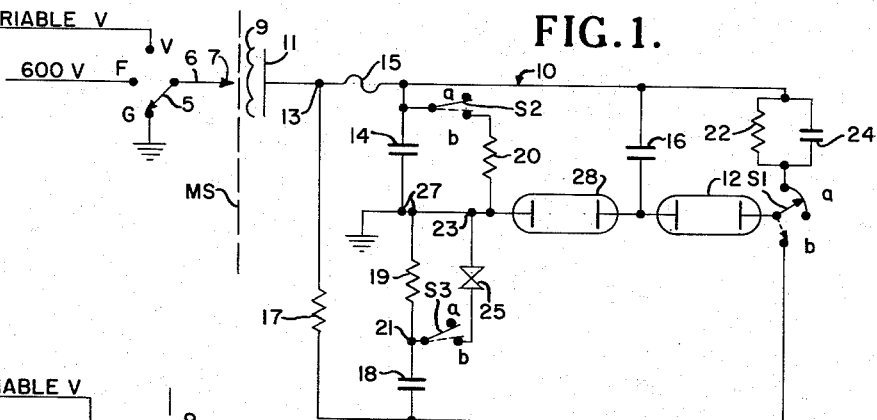
FIG. 1 is a schematic diagram for a single lead charging system for charging a voltage stabilized timing circuit and utilizing a fuze interconnected between the single lead and the timing circuit.

Referring now to the drawings, wherein like reference characters designate like or corresponding parts throughout the several views, there is shown in FIG. 1 a timing circuit, indicated generally by the numeral 10, which employs a discharge device 12 such as a cold cathode diode which is rendered conducting after a predetermined time delay, which time delay is independent of variations in diode breakdown potential and also independent of the stability of the charging potential.

More specifically, the circuit comprises a timing condenser 14, a stabilizing condenser 16, and a reference condenser 18. During the timing cycle, the aforementioned condensers are arranged in series circuit with the diode 12, with the potential on the reference condenser 18 aiding the potential on the stabilizing condenser 16 and opposing the potential on the timing condenser 14. The timing condenser 14 is arranged to discharge through a resistive discharge path such as the resistance 20, and when the voltage on the timing condenser 14 decays to a value which is less than the additive potentials on the reference condenser 18 and the stabilizing condenser 16 by an amount equal to the diode breakdown potential, the diode is rendered conducting. The timing circuits illustrated in FIGS. 2 to 9, inclusive, are duplicates of the timing circuit illustrated in FIG. 1 and operate the same as the timing circuit illustrated in FIG. 1.

Prior to the initiation of the timing cycle, the stabilizing condenser 16 is charged to a potential greater than the breakdown potential of the discharge device 12, and then stabilized at a voltage equal to the breakdown potential of the discharge device. For this purpose, various types of stabilizing circuits may be employed, some of which are disclosed in the copending application, Serial No. 219,302.

In the stabilizing circuit illustrated in FIGS. 1 to 9, the diode 12 is arranged for connection, as by switch S1 to the stabilizing circuit comprising a resistor 22 and condenser 24, arranged in parallel with each other, and in series with the diode 12 and the stabilizing condenser 16. During the stabilization cycle, the voltage on condenser 16 which is initially greater than the breakdown potential with diode 12 causes the latter to break down, thereby charging the condenser 24. When the voltage on the condenser 24 becomes such that the differential between the voltage on condenser 16 and the voltage on condenser 24 is equal to or slightly less than the conduction potential of the diode 12, the latter is rendered nonconducting, and condenser 24 then discharges through resistor 22 until the differential between the voltage on condenser 16 and voltage on condenser 24 again exceeds the breakdown potential of the diode 12. The cyclic charging and discharging of condenser 24 continues until the potential on the stabilizing condenser 16 is lowered to a value just below the breakdown potential of the diode 12 so that further stabilization steps are not possible.

Since a diode 12, during the timing cycle, is rendered conducting when the additive potentials on the reference condenser 18 and on the stabilizing condenser 16 exceed the potential on the timing condenser 14, by an amount equal to the breakdown potential of the diode 12, and since the potential on the stabilizing condenser has previously been stabilized at a value equal to the breakdown potential of the diode 12, it is deemed apparent that the diode 12 is rendered conductive whenever the potential on the reference condenser 18 exceeds the potential on the timing condenser 14 by a small amount.

In accordance wtih the present invention, the condensers in the timing circuit are charged through a single lead 6 from two voltage supply sources of different potentials indicated generally as 600V and Var. V. The voltage sources are connected individually to lead 6 through movable switch arm 5. Although not shown, switch arm 5 is actuated by an actuating mechanism to engage individually and in succession the ground contact G, the constant voltage contact F, and the variable voltage contact V in a predetermined sequence as determined by the actuating mechanism. Lead 6 is connected to a contact 7. The voltage sources and their respective contacts, switch arm 5 and its actuating mechanism (not shown), the lead 6 and contact 7 are mounted on a missile supporting device such as an aircraft bomb rack or rocket launching mechanism.

A conductive flexible membrane is mounted on the surface MS of the missile and is so situated as to come into engagement with contact 7 when the missile is placed in the missile supporting device. When the membrane 9 engages contact 7, contact 7 depresses membrane 9 to conductively engage stationary contact 11 which is mounted on the fuze to thereby complete the circuit from switch arm 5 to the timing circuit 10. The timing circuit is connected to stationary contact 11 through two paths having common termini 13 and 27. The first path, hereinafter referred to as the discriminator circuit, includes a discriminating device, such as a fuze 15 (FIG. 1), or an electro-thermically operated switch 15A (FIG. 2), or a diode (as illustrated in FIGS. 3 to 9), and a condenser to form a series circuit between junctions 13 and 27. The other path, hereinafter referred to as the electrically conductive circuit, includes a condenser and a resistive element connected in series between junctions 13 and 27 to present a conductive path to both the constant voltage and the variable voltage.

Referring to FIG. 1, when a missile is placed in the missile launching device, contact 7 depresses member 9 and, with switch arm 5 being connected to the ground contact, the condensers in the timing circuit are discharged through the reference potential level. The actuating mechanism then actuates switch arm 5 to engage contact F to apply a constant voltage to the timing condenser 14 through fuze 15 and to the reference condenser 18 through resistor 17. The characteristic of fuze 15 is such that it permits a surge of the constant voltage to pass therethrough to fully charge condensers 14 and 16 before burning out to open-circuit the discriminator circuit between junctions 13 and 27. Simultaneously with the application of the constant voltage to the discriminator circuit, the constant voltage is also applied to stabilizing condenser 18 through resistor 17. Upon condenser 14 being charged with the constant voltage, the stabilizing condenser is charged in parallel therewith through the diode 28. The voltage from the constant potential source 600V may be a pulse voltage, in which case only a diode such as 28 is provided to charge the stabilizing condenser 16.

A selectively variable voltage, which is proportional to the time interval desired to be established in the timing circuit, is provided by a variable voltage source indicated generally as Var. V connected to contact V. As switch arm 5 is continuously actuated by the actuating mechanism, it engages contact V, and, as is clearly illustrated in FIG. 1, the voltage appearing in contact V is applied through switch arms 5, lead 6, contacts 7, 9, and 11, to junction 13 through resistor 17, condenser 18, resistor 19, and to junction 27 which is connected to ground. Since the fuze 15 is burned out, the discriminator circuit is open circuited thereby preventing the variable voltage from effecting condenser 14, and therefore condenser 14 maintains the charge thereon from the 600 volt source. In this manner, the reference condenser 18 is charged to a voltage which is proportional to the voltage required to establish the desired predetermined interval of time in the timing circuit.

The timing device of the present invention is particularly adapted to control the actuation of a fuze of a bomb or rocket or the like and switches S1, S2, and S3 are arranged to be actuated by the missile supporting device such as an aircraft bomb rack or rocket launching mechanism so that switches S1, S2 and S3 are moved from position *a* to position *b* in response to release of the missile. As the missile is released, contact 7 is disengaged from contact 9 thereby disconnecting the voltage sources from the timing circuit.

The utility device such as the fuze detonator 25 is connected in shunt with the resistor 19, through switch S3, whereby the device is actuated when the discharge device 12 is rendered conducting.

In operation, upon the missile being mounted in the missile launching mechanism, the actuating mechanism moves switch arm to engage contact G to thereby discharge the timing condenser 14, the stabilizing condenser 16, and the reference condenser 18. Thereafter the actuating mechanism moves switch arm 5 to engage contact F whereby condenser 14 is charged through fuze 15 to a potential equal to the output potential of the constant voltage source, and stabilizing condenser 16 is charged to a potential which is less than the output of the constant voltage source by an amount equal to the extinguishing potential of the diode 28. As described heretofore, the characteristics of fuze 15 is such that it enables condenser 14 to be fully charged and then burn out to render the circuit in which condenser 14 is included open circuited thereby permitting condenser 14 to maintain its charge as provided by the constant voltage source 600V. With a pulse type charging system, the aforementioned stabilization process, whereby stabilizing condenser 16 is discharged to a value equal to the breakdown potential of the diode 12, is commenced.

Simultaneously with the application of the constant voltage to condenser 14, the condenser 18 is also charged with the constant potential through resistor 17.

Thereafter the actuating mechanism moves switch arm 5 to engage contact V which is connected to the variable voltage source Var. V. Since fuze 15 is burned out, condenser 14 is not affected by the variable voltage from the source Var. V. However, the circuit including condenser 18 is complete to thereby charge condenser 18 in accordance with the potential of the variable voltage source Var. V.

As this sequence of operation is completed, the missile is ready to be released. In response to release of the missile from the missile supporting device, the switches S1, S2 and S3 are moved from position *a* to position *b*, and initiates the timing cycle.

As apparent from FIG. 1 of the drawings movement of switch S2 from position *a* to *b* serves to connect the resistor 20 in parallel with the timing condenser 14, movement of switch S3 from *a* to *b* serves to connect detonator 25 in series between condenser 14 and condenser 18, and movement of switch S1 from position *a* to *b* disconnects the discharge device 12 from the stabilizing condenser 16, the reference condenser 18, and the detonator 25 in series with the diode 12, switch S1 also serving to disconnect the stabilizing circuit from the diode. When the switch S2 is moved to position *b* to connect resistance 20 in parallel with timing condenser 14, the voltage across the timing condenser 14 decays at a rate determined by the RC time constant of the circuit.

When the potential on condenser 14 decays to a value equal of the potential on the condenser 18, the combined additive potentials of the condenser 18 and the stabilizing condensers 16 exceed the potential on condenser 14 by an amount equal to the breakdown voltage of the diode 12, and the latter is rendered conductive thereby actuating the utility device such as detonator 25.

As is deemed apparent, by charging the stabilizing condenser 16 and timing condenser 14 through a first path including a discriminating device which permits charging of the condensers mentioned with the constant potential and which presents an open circuit to a variable potential, and by applying a selectively variable voltage to the reference condenser 18 through a second path having common termini with the first path, a stabilized timing circuit is provided which necessitates only a single lead to connect the timing circuit to the voltage sources.

In all of the circuits illustrated in FIGS. 1–9, the timing condenser 14 for all time settings, is charged to the same potential for all the different time settings and accordingly the voltage on the timing condenser can be accurately predicted. As hereinbefore set forth, changing of the measured time intervals is achieved by varying the potential applied to the reference condenser 18.

In the circuits illustrated in FIGS. 1–9, the diode 28 not only serves to permit rapid charging of the stabilizing condenser 16 during the charging cycle but in addition serves as a switch during the timing cycle to prevent discharge of the stabilizing condenser 16 through resistor 20.

Figure 2:
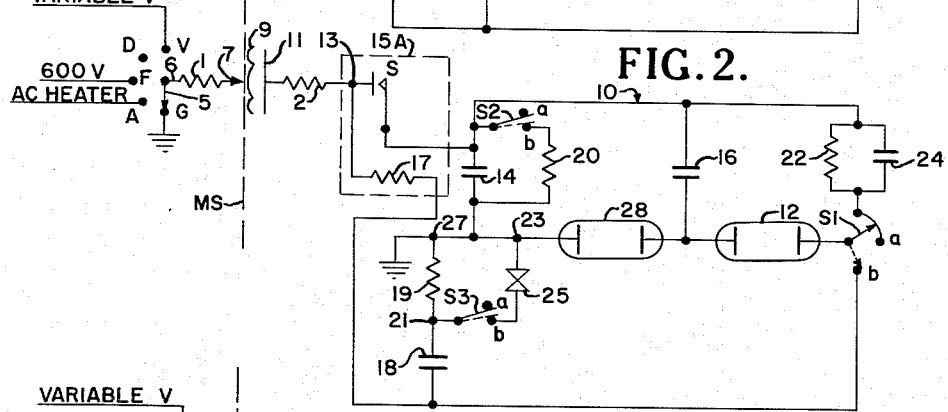
FIG. 2 illustrates a modification of the system in which an electro-thermically operated switch interconnects the single lead and the timing circuit.

Referring now to FIG. 2, the timing circuit 10 is a duplicate of the timing circuit illustrated in FIG. 1 with the exception that an electro-thermically operated switch 15A is utilized as the circuit breaking discriminating means and has two terminals indicated generally at S which are preheated from an A.C. heater source with which switch arm 5 engages prior to the successive engagements of the two voltage sources. Switch arm 5 engages contact A for just a sufficient period of time to enable the contacts S of switch 15A to close. Whereupon switch arm 5 is actuated to engage contact F of the source 600V to charge condensers 14, 16 and 18 as heretofore described. Switch arm 5 is then actuated to engage contact D to provide a delay whereby the contacts S are opened before switch arm 5 engages contacts V.

As is apparent from FIG. 2, the provision of an electro-thermically operated switch which has its contacts closed to one potential source and its contacts opened to another voltage source, there is provided a one lead charging system whereby the stabilizing condenser and the timing condenser are charged with the voltage from a constant voltage source and a reference condenser charged with the voltage from a selectively variable voltage source, the timing condenser and stabilizing condenser being unaffected by the voltage from the variable voltage source due to the fact that the circuit branch leading from junction 13 to the timing condenser and the stabilizing condenser is open-circuited when a variable voltage is applied to the timing circuit.

Figure 3:
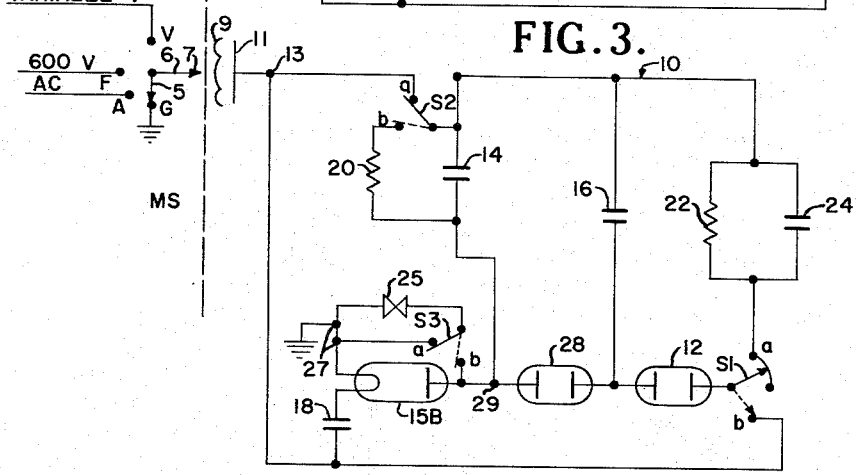

The circuit illustrated in FIG. 3 utilizes a diode 15B as the discriminating circuit breaking means. The power supply source includes a contact A which is connected to an alternating current source for heating the filament of the diode 15B when switch arm 5 is in engagement with contact A. After switch arm 5 has been in engagement with contact A for a sufficient period of time as determined by the actuating mechanism in order to sufficiently heat the filament of diode 15B to render it conductive, switch arm 5 is actuated to engage contact F. Since tube 15B has not sufficiently cooled, the 600 volt potential charges condenser 14 by completing the circuit from junction 13, contact *a*, switch arm S2, condenser 14, junction 29, the anode of diode 15B to the cathode of diode 15B to junction 27 to ground. Stabilizing condenser 16 is charged simultaneously therewith as described hereinbefore. Meanwhile the circuit for condenser 18 is completed from junction 13 through condenser 18 to the filament of diode 15B to junction 27 to ground. Thereafter switch arm 5 is actuated to engage contact V to apply the potential of the variable voltage source to condenser 18 through junction 13, condenser 18 through the filament of diode 15B to junction 27 to ground. Since diode 15B is not conductive during the application of the variable voltage, due to the variable voltage being less than the constant voltage, the circuit from junction 13 to condenser 14 is open-circuited and therefore condenser 14 is unaffected by the voltage from the variable voltage source Var. V.

Therefore, the circuit of FIG. 3 utilizes a diode in a circuit path to present a conductive path to one voltage and an open circuit path to another voltage while a circuit path presents a conductive path to both of the voltages. In FIG. 3, the circuit including condenser 14 can be considered to be the discriminator circuit heretofore mentioned, whereas the circuit including condenser 18 can be considered to be the electrically conductive circuit heretofore mentioned.

Referring now to FIG. 4, there is illustrated a modification of FIG. 3 wherein the diode 15C has its electrodes connected in the circuit path between junctions 13 and 27 including condenser 18, with the filament of the tube 15C being connected in another circuit path in series with condenser 14 between junctions 13 and 27. It is to be noted that, in contradistinction with FIG. 3, the electrically conductive circuit includes condenser 14 and the discriminator circuit is the path including condenser 18 since the path including condenser 18 presents a conductive path to the variable voltage and an open circuit to the constant voltage 600V due to diode 15C becoming non-conductive before the application to the timing circuit of the constant voltage 600V. In the arrangement illustrated in FIG. 4, the diode 15C is preheated from an A.C. source connected to contact A, switch arm 5, junction 13, contact a, switch S2, condenser 14, and the filament of diode 15C to ground 27 thereby rendering tube 15C conductive. Switch arm 5 is now actuated to engage contact V to apply the voltage from the variable voltage source to condensers 14 and 18 through their respective paths. Upon condenser 18 being charged to its desired value proportion to the voltage of the variable voltage source, switch arm 5 is actuated to engage contact D, presenting a delay in the application of any voltage to the timing circuit to enable diode 15C to cool sufficiently to become non-conductive. Thereafter switch arm 5 is actuated to engage contact F whereby the voltage from the constant voltage source 600V is applied to condenser 14 through junction 13, contact a, switch S2, condenser 14, the cathode of diode 15C, and junction 27 to ground. Since the diode 15C is no longer conductive, the circuit path including condenser 18 is open-circuited to prevent condenser 18 from being effected by the voltage from the constant voltage source 600V.

As is obvious from an anlysis of FIGS. 3 and 4, FIG. 4 is substantially identical with the circuit of FIG. 3 with the exception that the voltages are applied in reverse order and the diode discriminating device is connected in the circuit accordingly.

The circuit of FIG. 5 is another modification of FIG. 3 with the diode 15D being connected between the junction 13 and condenser 14 and the applied voltages being of negative polarity, but otherwise operates the same as the circuit of FIG. 3, except diode heating is established by the pulse charge.

FIG. 6 is another modification of FIG. 3 which utilizes induction coupling means to render the diode 15E conductive. An iron core CS is mounted within the fuze in subadjacency to the surface MS of the fuze and has a winding SW wound thereon, the winding SW being connected across the filament of diode 15E. Another iron core CP is mounted in the missile launching device and arranged to be in contiguous relation with iron core CS. A winding PW is wound on core CP, one end of winding PW being connected to one side of an alternating current source 4, the other side of winding PW being connected to a movable switch arm 3 which is ganged to move in unison with switch arm 5. When switch arm 5 is actuated to engage contact F, switch arm 3 engages contact b, energizing winding PW and consequently inducing a voltage in winding CW which is sufficient to render diode 15E conductive during the application thereto of the constant voltage 600V from contact F. Thereafter switch arms 5 and 3 are simultaneously moved to the C and V contacts whereby switch arm 5 engages contact V to apply the variable voltage to charge condenser 18, the condenser 14 being unaffected thereby since diode 15E, being non-conductive, presents an open circuit thereto. In the arrangement of FIG. 6, the circuit path including condenser 14 can be considered to be the discriminator circuit since it presents a conductive path only to the constant voltage, and the circuit path including condenser 18 can be considered to be the electrically conductive circuit since it presents a conductive path to both the constant voltage and to the variable voltage.

In the system of FIG. 6, the voltage from the constant potential source 600V may be either a pulse voltage, in which case only a diode such as 28 may be provided to charge the stabilizing condenser 16 or the voltage may be a continuous voltage in which case a high resistance 26 is preferably provided in parallel with the diode 28. With a pulse type charging system, resistor 26 is omitted and the aforedescribed stabilization process, whereby stabilizing condenser 16 is discharged to a value equal to the breakdown potential of the diode 12, is commenced.

With a continuous charge system, a high resistance 26 is provided in shunt with the diode 28 so that the stabilization process can commence as soon as the stabilizing condenser 16 has been connected to the voltage source 600V. The resistor 26 limits the rate of charge of the condenser 16 whereby the stabilization of condenser 16 continues, as previously described, until the voltage across condenser 16 becomes equal to the breakdown potential of diode 12. However, since condenser 16 is slowly recharged through resistor 26, the stabilization process is resumed whenever the voltage on condenser 16 exceeds the diode breakdown potential. In this manner, the voltage across condenser 16 becomes substantially equal to the breakdown potential of diode 12, and will keep stabilizing at that value during charge time.

In those applications utilizing a continuous charge system as contrasted to a pulse charge system in which the shunt resistor 26 is employed, the discharging of the condenser 16 through resistor 26 is not appreciable since the resistance of resistor 26 is high.

Referring now to FIG. 7 there is shown a variation of the circuit shown in FIG. 5 utilizing voltages of negative polarity but with the discriminating device being a diode 15F connected serially to condenser 14 between junctions 13 and 27 with the cathode of diode 15F being connected serially with condenser 18 between junctions 13 and 27. In this arrangement, the discriminating circuit path is the path including condenser 14 and the electrically conductive path is the path including condenser 18. The diode 15F, in FIG. 7, is conductive during the application thereto of the constant voltage to charge condensers 14 and 16, but has sufficiently cooled prior to the application thereto of the variable voltage to become non-conductive when the variable voltage is applied thereto therefore presenting an open circuit into the variable voltage through the path including condenser 14 but presents a completed path to condenser 18 through its filament which acts merely as a conductive lead.

The modification illustrated in FIG. 8 is a variation of the circuit shown in FIG. 7 wherein the diode 15G is connected serially between junction 13 and condenser 18 with the variable voltage being applied to the timing circuit prior to the application thereto of the voltage from the constant voltage source. Also due to the fact that diode 15G has its cathode connected to junction 13, it is necessary that the voltages applied be of negative plurality in order to conductively pass through diode 15G. Otherwise, the circuit of FIG. 8 functions the same as the circuit of FIG. 7. In the arrangement of FIG. 8, the discriminator circuit is deemed to be the circuit including condenser 18 since this path passes only variable voltage potential and appears open-circuited to the constant voltage potential since diode 15G is non-conductive when the constant voltage −600V is applied to the timing circuit, and the circuit path including condenser 14 constitutes the heretofore mentioned electrically conductive path since it presents a conductive path to both the negative variable voltage and the negative constant voltage.

Referring now to FIG. 9, there is shown a circuit which is substantially a duplicate of the circuit of FIG. 3 but utilizing a dual diode 15H in place of the diodes 15B and 28 of FIG. 3. Otherwise, FIGS. 3 and 9 operate identically in the same manner.

In FIGS. 2 to 9, the timing circuit including the stabilization network 22—24 and the switches S1, S2 and S3, and the diodes 12 and 28 function in the same manner to actuate detonator 25 as discussed heretofore with respect to the operation of FIG. 1.

Although the constant voltage has been shown to be a 600 volt source in all the figures illustrated, it is to be understood that any constant value may be used and that the circuits illustrated are not restricted to the utilization of 600 volts. The variable voltage source has a value which is less than the value of the constant voltage source. The desired value of the variable voltage is determined by the time interval desired to be attained in the timing circuit.

In summarizing, there is disclosed herein a single lead charging system which is applicable to many variations of timing circuit arrangements as illustrated. The modifications each present two paths to the single charging lead, one of the paths being adapted to conductively pass two voltages of different potentials and the second path being adaptable to pass one of the two voltages and to present an open circuit to the other of the two voltages.

Obviously many modifications and variations of the present invention are possible in the light of the above teachings. It is therefore to be understood that within the scope of the appended claims the invention may be practiced otherwise than specifically described.

What is claimed as new and desired to be secured by Letters Patent of the United States is:

1. In a timing circuit energized with two voltages of different potentials through a single lead, an electrically conductive circuit presenting a conductive path to both of said voltages, and a discriminator circuit presenting a conductive path to one of said voltages and a non-conductive path to the other of said voltages, said conductive circuit and said discriminator circuit having common termini.

2. In a timing circuit energized with two voltages of different potentials through a single lead, an electrically conductive circuit presenting a conductive path to both of said two voltages, a discriminator circuit adaptable to present a conductive path to one of said voltages and a non-conductive path to the other of said voltages, said conductive circuit and said discriminator circuit having common termini, and voltage discriminating means in said discriminator circuit for enabling the discriminator circuit to present a conductive path to said one voltage and a non-conductive path to said other voltage.

3. The circuitry as defined in claim 2, wherein said discriminating means comprises a fuze.

4. The circuitry as defined in claim 2, wherein said discriminating means comprises an electro-thermically operated switch.

5. The circuitry of claim 2, wherein said discriminating means comprises an electron discharge device.

6. The circuitry of claim 5, wherein said electron discharge device has an electrode connected to one of said termini.

7. The circuitry of claim 6, wherein said electron discharge device is a diode and said electrode being the cathode thereof.

8. The circuitry of claim 6, wherein said conductive circuit includes a first condenser and said electrode connected in series, and said discriminator circuit includes a second condenser and said electron discharge device connected in series.

9. The circuitry of claim 6, wherein said electron discharge device is a diode, said electrode being the anode thereof, and further including inductive energizing means connected across the cathode and adapted to be energized from an alternating current source to develop an energizing potential for rendering said diode conductive.

10. A charging system for a stabilized time fuze comprising, in combination, a first contact connected to a point of fixed reference potential, a second contact connected to an energizing source of constant potential, a third contact connected to an energizing source of selectively variable potential, a fourth contact adapted to engage said first, second and third contacts individually in a predetermined sequence, a fifth contact conductively connected to said fourth contact, a fuze contact insulatably mounted on said fuze and adapted to conductively engage said fifth contact, a timing circuit adaptable to be energized from said source of constant potential and said source of variable potential for establishing a predetermined time interval in response to the sequential application thereto of the potentials from said sources, an electrically conductive circuit connecting said fuze contact to said point of fixed reference potential and including a first condenser of said timing circuit and presenting a conductive path to said constant and variable potentials whereby said potentials may be applied in said predetermined sequence to said timing circuit, a discriminator circuit adaptable to present a conductive path to said constant potential and a non-conductive path to said variable potential connecting said fuze contact to said point of fixed reference potential, said discriminator circuit including a second condenser of said timing circuit, said constant potential being applied to said timing circuit simultaneously through said conductive circuit and said discriminator circuit, and voltage discriminating means in said discriminator circuit for enabling said discriminator circuit to present a conductive path to said constant potential and a non-conductive path to said variable potential.

11. The charging system of claim 10, wherein said discriminating means comprises a fuze connected in series with said second condenser, and said predetermined sequence of engagement with said fourth contact being, in the order named, said first contact, said second contact, and said third contact.

12. The charging system of claim 10, wherein said discriminating means comprises an electro-thermically operated switch; and further including a heater contact connected to an electrical heating source for providing a heating current for said switch and adapted to engage said fourth contact; said predetermined sequence of engagement with said fourth contact being, in the order named, said first contact, said second contact, and said third contact; said heater contact engaging said fourth contact subsequent to the engagement of said fourth contact with said first contact and prior to the engagement of said fourth contact with said second contact.

13. The charging system of claim 10, wherein said discriminating means comprises an electron discharge device, said electron discharge device being connected to said second condenser to form a series circuit therewith between said fuze contact and said point of fixed reference potential.

14. The charging system of claim 13, wherein said first condenser is connected to an electrode of said discharge device, said first condenser and said electrode forming a series circuit between said fuze contact and said point of fixed reference potential.

15. The charging system of claim 13, wherein said electron discharge device has at least two electrodes, one of said electrodes being connected to said second condenser, the other of said electrodes having two terminals, one of said terminals being connected to said point of fixed reference potential and the other of the terminals being connected to said first condenser.

16. The charging system of claim 13, wherein said electron discharge device has at least two electrodes, one of said electrodes being connected to said second condenser, the other of said electrodes having two terminals, one of said terminals being connected to said fuze contact and the other of said terminals being connected to said first condenser.

17. The charging circuit of claim 13, wherein said electron discharge device has at least two electrodes, one of said electrodes being connected to said second condenser, the other of said electrodes having two terminals, one of said terminals being connected to said point of fixed reference potential and the other of said terminals being connected to said first condenser; and further including a heater contact connected to an electrical heating current supply for providing a heating current to conductively pass through said other electrode, said heater contact being adapted to engage said fourth contact; in said predetermined sequence said fourth contact engages said first contact first and then follows with successive engagements with the contacts connected to said sources, said heater contact engaging said fourth contact subsequent to the engagement of said fourth contact with said first contact and prior to the engagement of said fourth contact with the contacts connected to said sources.

18. The charging system of claim 13, wherein said electron discharge device has at least two electrodes, one of said electrodes being connected to said second condenser, the other of said electrodes having two terminals, one of said terminals being connected to said fuze contact and the other of said terminals being connected to said first condenser; and further including a heater contact connected to an electrical heating current supply for providing a heating current to conductively pass through said other electrode, said heater contact being adapted to engage said fourth contact; in said predetermined sequence said fourth contact engages said first contact and then follows with successive engagements with the contacts connected to said sources, said heater contact engaging said fourth contact subsequent to the engagement of said fourth contact with said first contact and prior to the engagement of said fourth contact with the contacts connected to said sources.

19. The charging system of claim 13, wherein said electron discharge device has at least two electrodes, one of said electrodes being connected to said fuze contact, the other of said electrodes having two terminals, said second condenser being connected to one of said two terminals, and further including a first iron core mounted subadjacent to the surface of said fuze, and an inductive winding wound on said core, said winding being connected across said two terminals.

20. The charging system of claim 19, further including a source of alternating current; a second iron core mounted adjacent to the surface of said fuze and in proximity with said first iron core; an inductive winding wound on said second iron core and adaptable to be connected to said source of alternating current to induce a voltage in said first winding thereby to render said electron discharge device conductive; said predetermined sequence of engagement with said fourth contact being, in the order named, said first contact, said second contact and said third contact; said second inductive winding being connected to said alternating current source only during engagement of said second contact with said fourth contact.

References Cited in the file of this patent

UNITED STATES PATENTS

| | | |
|---|---|---|
| 1,841,983 | Ruhlemann | Jan. 19, 1932 |
| 2,545,474 | Kurland et al. | Mar. 20, 1951 |